United States Patent
Hwangbo et al.

(10) Patent No.: US 11,698,545 B2
(45) Date of Patent: *Jul. 11, 2023

(54) LIQUID CRYSTAL PANEL AND LIQUID CRYSTAL PANEL ETCHING METHOD

(71) Applicant: KORTEK CORPORATION, Incheon (KR)

(72) Inventors: Woo Hwangbo, Yongin-si (KR); Young Il Park, Incheon (KR); Hae Won Chae, Hwaseong-si (KR); Ji Woong Park, Jeonju-si (KR)

(73) Assignee: KORTEK CORPORATION, Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/299,806

(22) PCT Filed: Dec. 10, 2019

(86) PCT No.: PCT/KR2019/017338
§ 371 (c)(1),
(2) Date: Jun. 4, 2021

(87) PCT Pub. No.: WO2020/122536
PCT Pub. Date: Jun. 18, 2020

(65) Prior Publication Data
US 2022/0026755 A1 Jan. 27, 2022

(30) Foreign Application Priority Data

Dec. 11, 2018 (KR) .................. 10-2018-0159301

(51) Int. Cl.
*G02F 1/1333* (2006.01)
*G02F 1/1339* (2006.01)

(52) U.S. Cl.
CPC ...... *G02F 1/133305* (2013.01); *G02F 1/1339* (2013.01)

(58) Field of Classification Search
CPC ................................................. G02F 1/133305
See application file for complete search history.

(56) References Cited

U.S. PATENT DOCUMENTS

2017/0351135 A1 12/2017 Kim et al.
2019/0113795 A1* 4/2019 Lee ........................... G09F 9/00

FOREIGN PATENT DOCUMENTS

| KR | 10-1333770 B1 | 11/2013 |
| KR | 10-2015-0083448 A | 7/2015 |
| KR | 10-2016-0112123 A | 9/2016 |
| KR | 10-2017-0143355 A | 12/2017 |

OTHER PUBLICATIONS

International Search Report for PCT/KR2019/017338 dated Mar. 17, 2020.

* cited by examiner

*Primary Examiner* — Edmond C Lau
(74) *Attorney, Agent, or Firm* — Schmeiser, Olsen & Watts, LLP (57) ABSTRACT

Provided is a liquid crystal panel and a liquid crystal panel etching method, the liquid crystal panel including a second substrate installed in a state of being spaced apart from a first substrate while having the first substrate and a liquid crystal layer interposed therebetween, wherein the first substrate is etched across the entire area thereof, and the second substrate has a non-etched region.

5 Claims, 7 Drawing Sheets

LIQUID CRYSTAL PANEL AND LIQUID CRYSTAL PANEL ETCHING METHOD

CROSS-REFERENCE TO RELATED APPLICATIONS

This application claims priority to PCT Application No. PCT/KR2019/017338, having a filing date of Dec. 10, 2019, based on KR 10-2018-0159301, having a filing date of Dec. 11, 2018, the entire contents all of which are hereby incorporated by reference.

FIELD OF TECHNOLOGY

The following relates to a liquid crystal panel and a liquid crystal panel etching method, and more particularly, to a liquid crystal panel, which is stably bendable without being damaged, and a liquid crystal panel etching method.

BACKGROUND

With the development of the information society, display devices capable of displaying information are being actively developed. The display devices include liquid crystal display (LCD) devices, organic electro-luminescence display devices, plasma display panel devices, and field emission display devices.

Among the display devices, since the LCD devices have advantages of a thin thickness, low power consumption, and a full-color video implementation, the LCD devices are being widely applied to mobile phones, navigation devices, monitors, televisions, and the like.

The LCD device adjusts light transmittance of liquid crystal cells on a liquid crystal panel to display an image corresponding to a video signal. Typically, the liquid crystal panel includes a lower substrate, an upper substrate, and a liquid crystal layer interposed therebetween.

A thin film transistor (TFT)-LCD using a TFT as a switching element is mainly used as the LCD device. A plurality of display signal lines, such as gate lines, data lines, and a plurality of TFTs, and pixel electrodes are formed on a lower substrate of two substrates of the liquid crystal panel, which are disposed to face each other, and a color filter and a common electrode are formed on an upper substrate of the two substrates.

Since the liquid crystal panel is usually manufactured in a flat shape, when a curved display is required, an etching solution is sprayed onto the liquid crystal panel to thin the liquid crystal panel to a set thickness, and then a process of bending the liquid crystal panel is performed.

A driving circuit may be installed on an edge of the liquid crystal panel and may include a printed circuit board (PCB) which transmits signals and a chip on film (COP) which connects the PCB to the liquid crystal panel. In addition, when the etching solution is sprayed on the edge of the liquid crystal panel, the edge of the liquid crystal panel can be easily broken. Thus, a masking process is performed to prevent the etching solution from being sprayed on the edge of the liquid crystal panel.

According to the related art, when the liquid crystal panel on which etching is performed is bent, since the edge of the liquid crystal panel, on which the etching is not performed, has a thickness that is greater than a thickness of a portion on which the etching is performed, there is a problem in that the edge is damaged during bending. Therefore, there is a need to solve such a problem.

The background art of the present invention is disclosed in Korean Patent Registration No. 10-1333770 (registered on Nov. 21, 2013, entitled "Etching device, Apparatus for manufacturing display panel with curved shape and of comprising the device, Method for manufacturing display panel with curved shape by using the apparatus, display panel with curved shape manufactured by the method").

SUMMARY

An aspect relates to providing a liquid crystal panel, which is stably bendable without being damaged, and a liquid crystal panel etching method.

One aspect of embodiments of the present invention provides a liquid crystal panel including a first substrate and a second substrate installed in a state of being spaced apart from the first substrate with a liquid crystal layer interposed therebetween, wherein an entire area of the first substrate is etched and a non-etched region is provided in the second substrate.

The first substrate may include a first base member formed in a plate shape facing the liquid crystal layer and etched twice, a first head portion which is connected to one side of the first base member and on which only primary etching is performed, and a first tail portion which is connected to the other side of the first base member and on which only primary etching is performed.

A thickness of each of the first head portion and the first tail portion may be greater than a thickness of the first base member.

The first head portion and the first tail portion have the same thickness.

The second substrate may include a second base member facing the first base member with the liquid crystal layer interposed therebetween, a second head portion which is connected to one side of the second base member and on which only primary etching is performed, an extension which is connected to the second head portion and on which etching is not performed, and a second tail portion which is connected to the other side of the second base member and on which only primary etching is performed.

A thickness of each of the second head portion and the second tail portion may be greater than a thickness of the second base member, and a thickness of the extension may be greater than the thickness of each of the second head portion and the second tail portion.

The second head portion and the second tail portion have the same thickness.

The first head portion may be disposed to be offset from the extension with a separation section interposed therebetween.

Another aspect of embodiments of the present invention provides a liquid crystal panel etching method including installing an encapsulation portion configured to prevent infiltration of an etching solution on an extension of a second substrate and a control portion connected to the second substrate, primary etching of the first substrate and the second substrate using an etching solution, installing a masking member in portions of the first substrate and the second substrate, on which only the primary etching is performed, secondary etching of the first substrate and the second substrate using an etching solution, and removing the encapsulation portion and the masking member.

The installing of the encapsulation portion may include installing masking tape on the control portion and installing a sealing member between the masking tape and the first substrate, installing an encapsulation member that surrounds the sealing member and the control portion, and fixing the encapsulation member to the sealing member and the extension.

In the primary etching of the first substrate and the second substrate, a first head portion, a first base member, and a first tail portion of the first substrate may be etched to the same thickness, and a second head portion, a second base member, and a second tail portion of the second substrate may also be etched to the same thickness.

In the installing of the masking tape, the masking member may be installed on outer sides of the first head portion, the first tail portion, the second head portion, and the second tail portion.

In the secondary etching of the first substrate and the second substrate, only the first base member and only the second base member may be secondarily etched.

In accordance with a liquid crystal panel and a liquid crystal panel etching method according to embodiments of the present invention, masking is applied differently to a first substrate and a second substrate, and a thickness of a non-etched region formed after etching the first substrate and the second substrate using a double etching method is decreased so that a display with a small radius of curvature can be easily implemented.

BRIEF DESCRIPTION

Some of the embodiments will be described in detail, with reference to the following figures, wherein like designations denote like members, wherein.

Hereinafter, a liquid crystal panel and a liquid crystal panel etching method according to one embodiment of the present invention will be described with reference to the accompanying drawings. In the following description, thicknesses of lines and sizes of components shown in the drawings may be exaggerated for clarity and convenience of description.

In addition, the terms described below are defined in consideration of the functions in embodiments of the present invention, and these terms may be varied according to the intent or custom of a user or an operator. Therefore, these terms should be defined on the basis of the contents throughout the present application.

Figure 1:
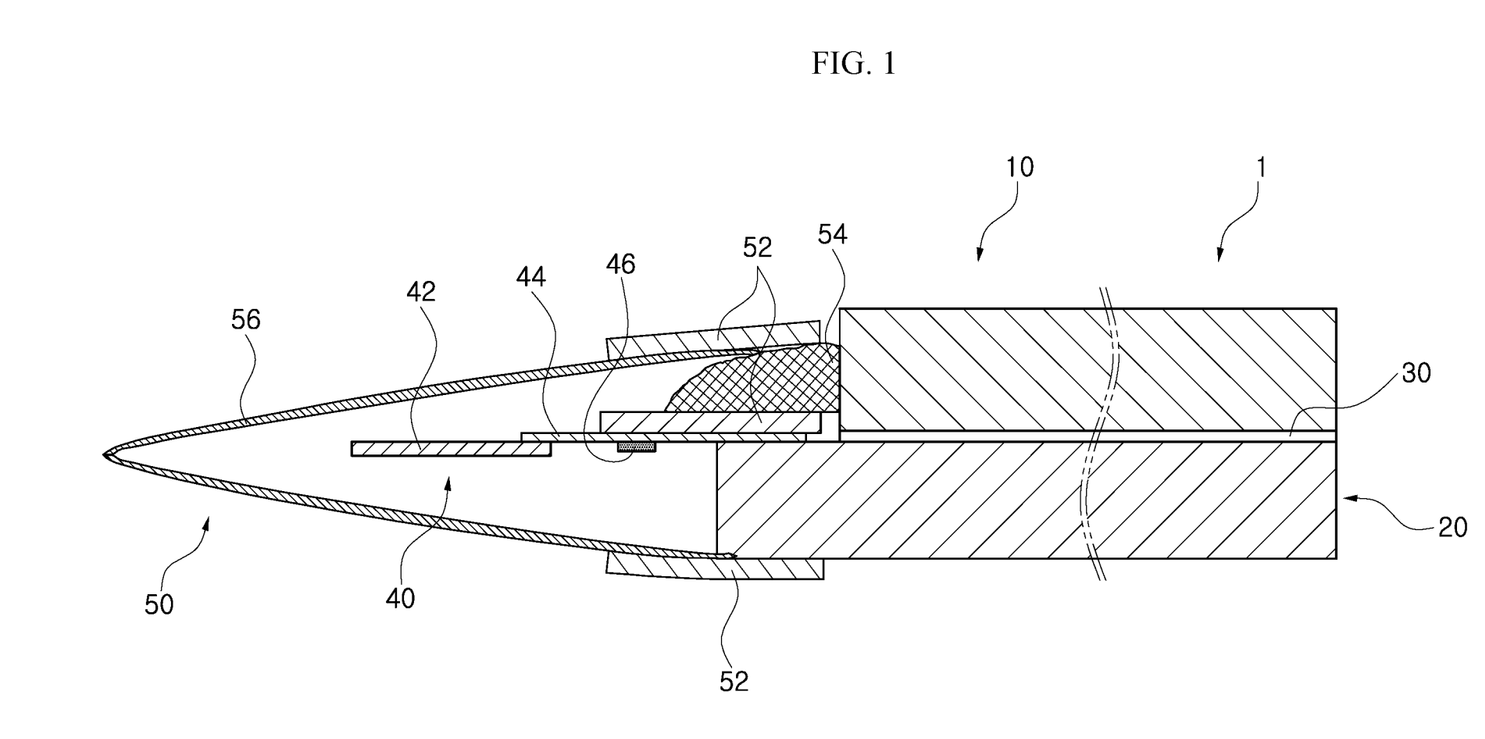
FIG. 1 is a cross-sectional view illustrating a state in which an encapsulation portion is installed on a liquid crystal panel according to one embodiment of the present invention.
Figure 2:
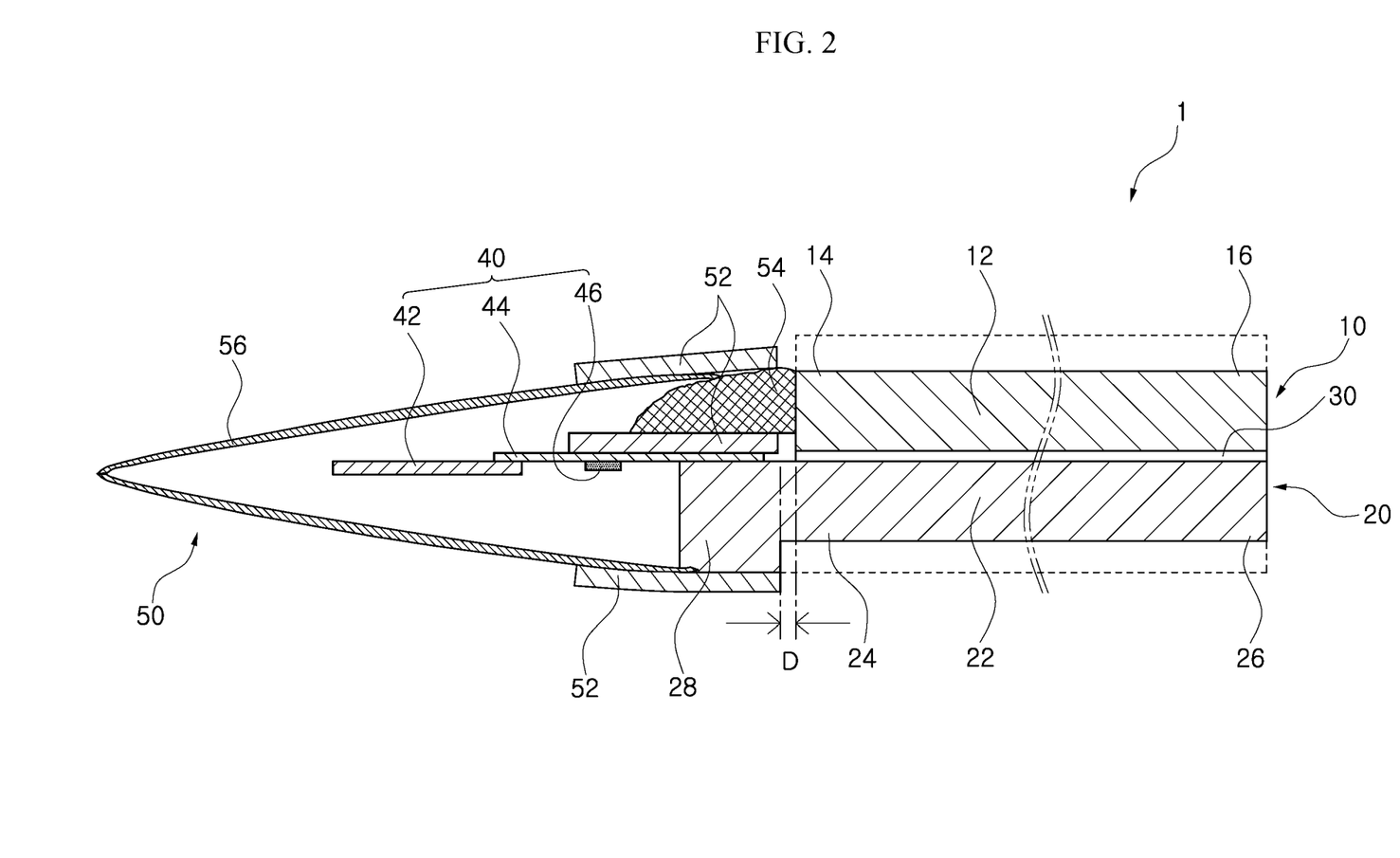
FIG. 2 is a cross-sectional view illustrating a state in which the liquid crystal panel is primarily etched according to one embodiment of the present invention.
Figure 3:
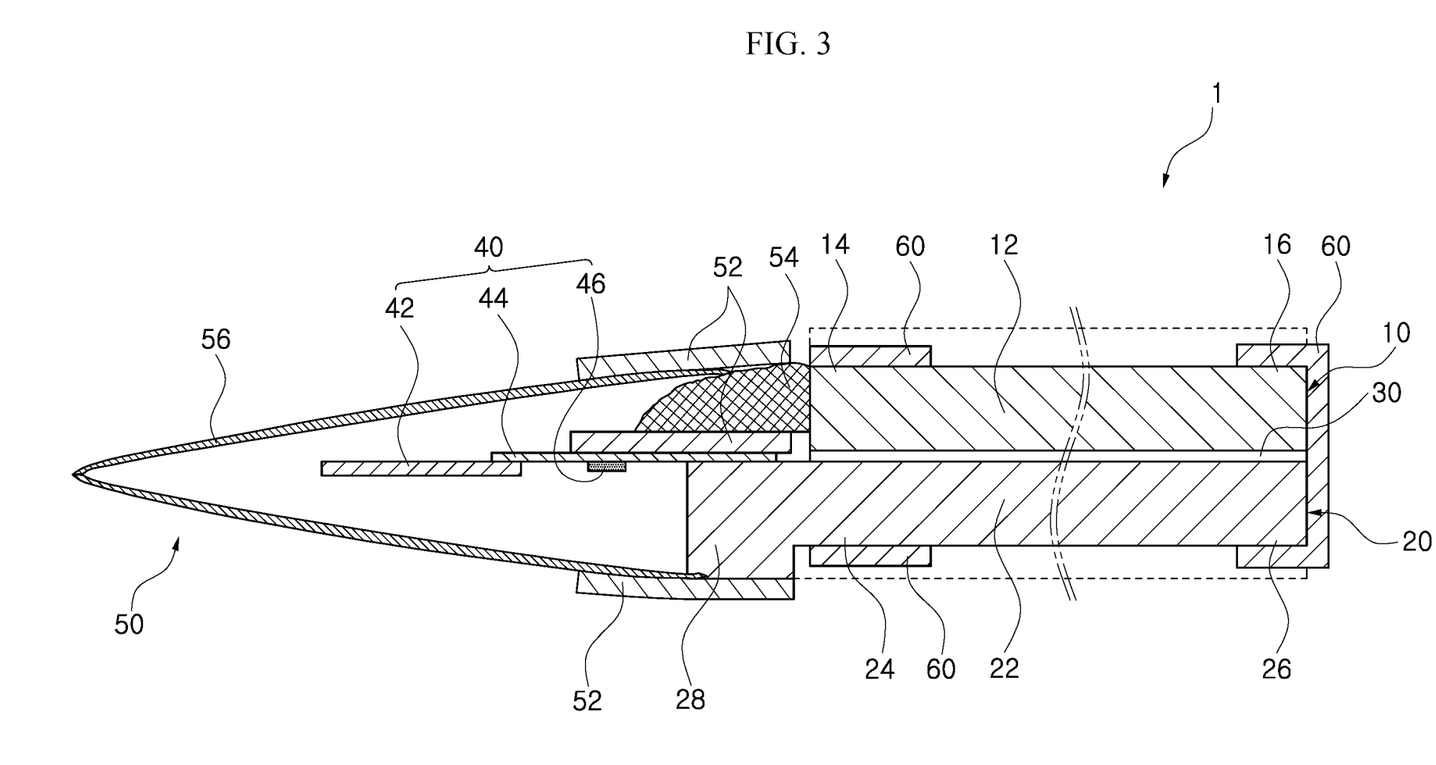
FIG. 3 is a cross-sectional view illustrating a state in which a masking member is installed on an outer side of the liquid crystal panel according to one embodiment of the present invention.
Figure 4:
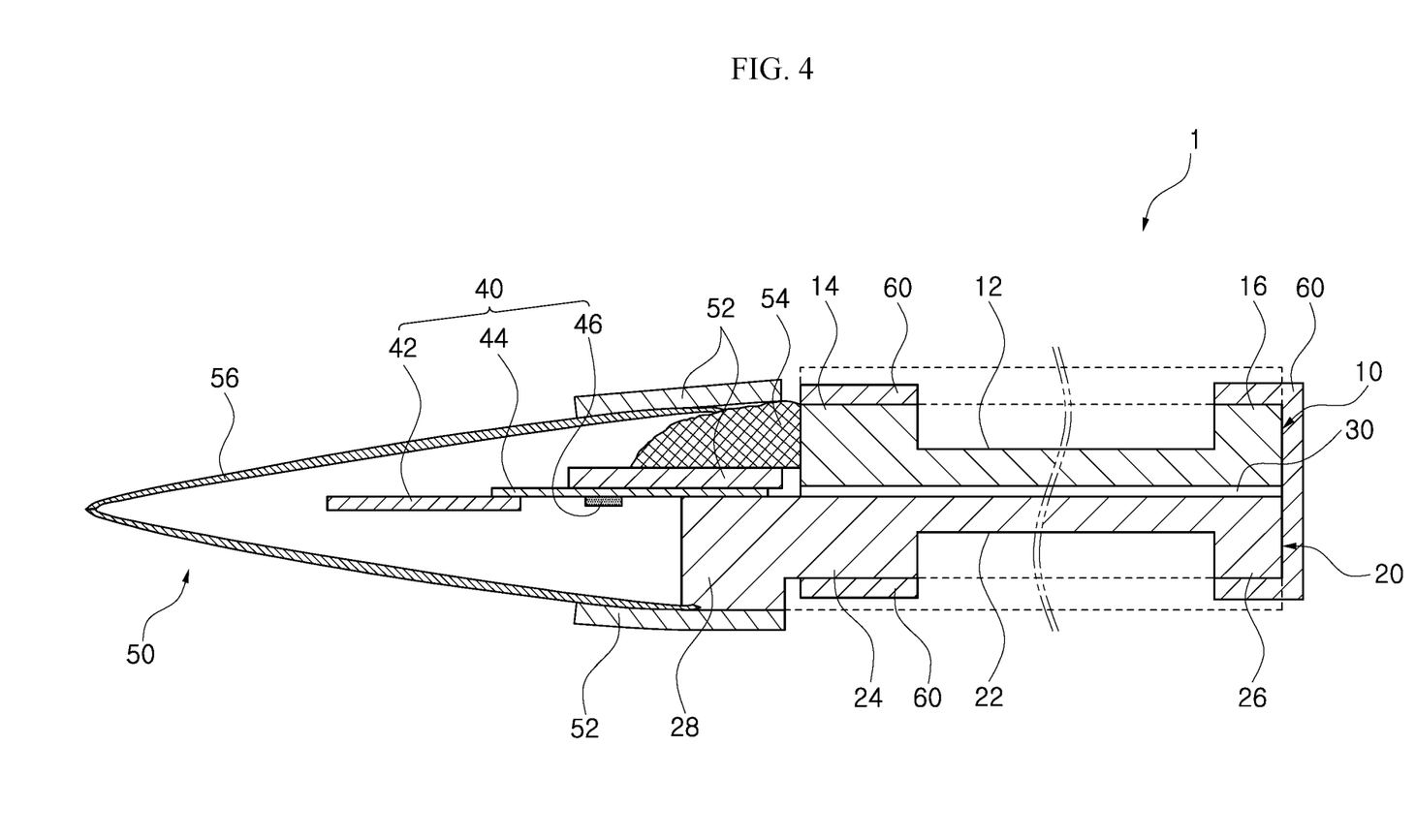
FIG. 4 is a cross-sectional view illustrating a state in which the liquid crystal panel is secondarily etched according to one embodiment of the present invention.
Figure 5:
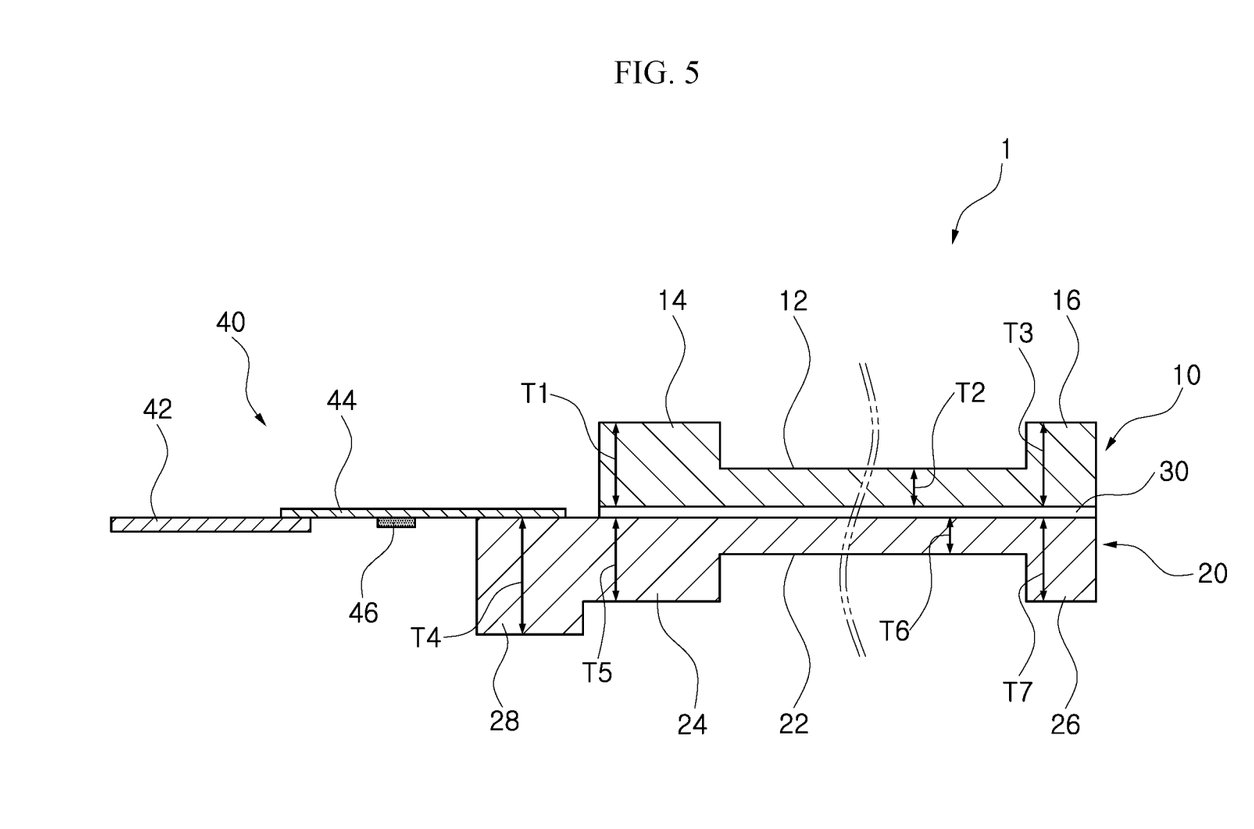
FIG. 5 is a cross-sectional view illustrating a state in which the encapsulation portion and the masking member are removed from the liquid crystal panel according to one embodiment of the present invention.
Figure 6:
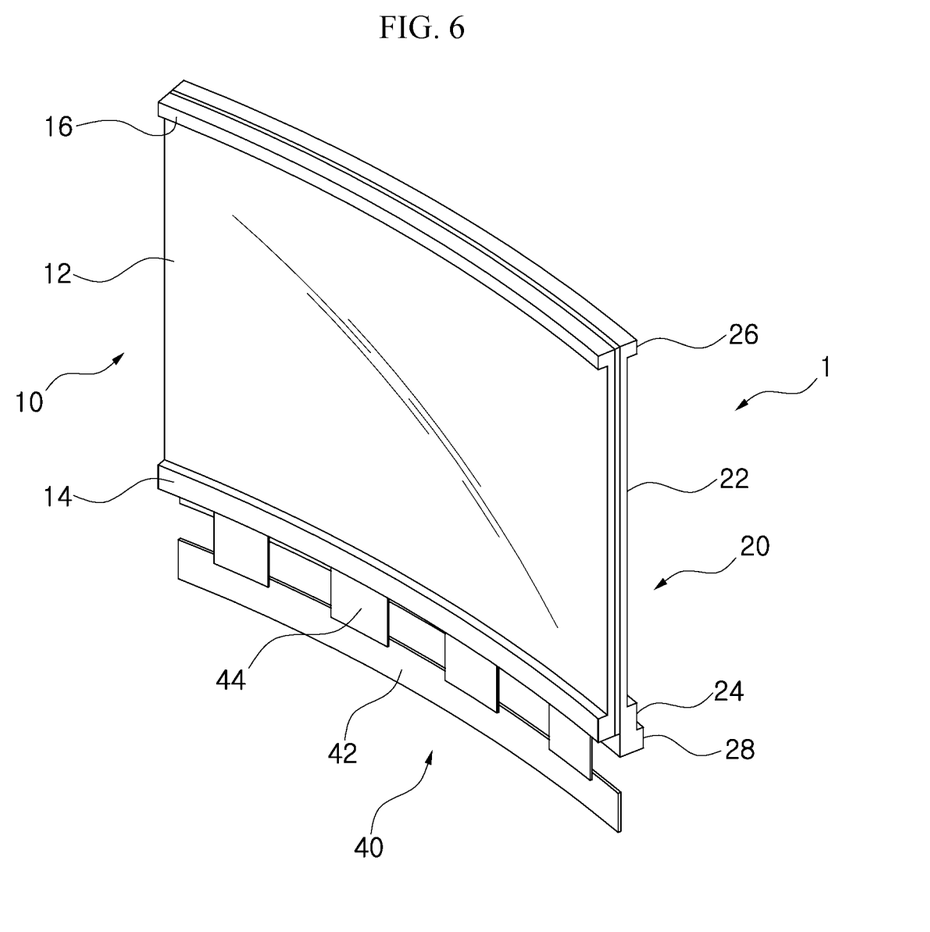
FIG. 6 is a perspective view illustrating a state in which the liquid crystal panel is bent in a curved shape according to one embodiment of the present invention.

FIG. 1 is a cross-sectional view illustrating a state in which an encapsulation portion is installed on a liquid crystal panel according to one embodiment of the present invention, FIG. 2 is a cross-sectional view illustrating a state in which the liquid crystal panel is primarily etched according to one embodiment of the present invention, FIG. 3 is a cross-sectional view illustrating a state in which a masking member is installed on an outer side of the liquid crystal panel according to one embodiment of the present invention, FIG. 4 is a cross-sectional view illustrating a state in which the liquid crystal panel is secondarily etched according to one embodiment of the present invention, FIG. 5 is a cross-sectional view illustrating a state in which the encapsulation portion and the masking member are removed from the liquid crystal panel according to one embodiment of the present invention, and FIG. 6 is a perspective view illustrating a state in which the liquid crystal panel is bent in a curved shape according to one embodiment of the present invention.

As shown in FIGS. 1 to 6, a liquid crystal panel 1 according to one embodiment of the present invention includes a first substrate 10 and a second substrate 20 installed in a state of being spaced apart from the first substrate 10 with a liquid crystal layer 30 interposed therebetween. Etching is performed on an entire area of the first substrate 10, and a non-etched region is provided on one side of the second substrate 20.

According to embodiments of the present invention, a thickness of the non-etched region, which is formed when the liquid crystal panel 1 is etched, is decreased so that, when the liquid crystal panel 1 is bent with a small radius of curvature, a stable panel shape may be obtained. To this end, different masking and etching methods are applied to locations according to a structural shape of the liquid crystal panel 1.

A variety of modifications of the liquid crystal panel 1 are possible within the technical spirit of bonding a plurality of glasses. The liquid crystal panel 1 according to one embodiment is coupled in a state in which the first substrate 10 faces the second substrate 20, and the liquid crystal layer 30 is provided between the first substrate 10 and the second substrate 20.

According to one embodiment, the first substrate 10 is a color filter (CF) substrate, and the second substrate 20 is a thin film transistor (TFT) substrate. The first substrate 10 is spaced a predetermined interval from the second substrate 20, and a liquid crystal is injected between the first substrate 10 and the second substrate 20 to form the liquid crystal layer 30.

The liquid crystal panel 1 has a structure in which the first substrate 10 and the second substrate 20 are bonded, and an electrode pattern is formed on the second substrate 20 to allow an electrical signal to be applied. A portion of the electrode pattern formed on the second substrate 20 is exposed to the outside of the second substrate 20 and designed to receive an electrical signal applied from the outside.

That is, when the first substrate 10 and the second substrate 20 are bonded, some electrodes of the second substrate 20 are bonded to be exposed to the outside. Generally, the second substrate 20 is designed to have a total area that is greater than an area of the first substrate 10. The electrodes exposed from the second substrate 20 may be coupled to other devices to receive electrical signals.

In addition, the liquid crystal panel 1 is formed in a rectangular shape, and the second substrate 20 located on one side of the liquid crystal panel 1 is installed in a shape protruding further than the first substrate 10. A control portion 40 is connected to the second substrate 20. The control portion 40 includes a printed circuit board (PCB) 42, a flexible connector 44, and a driving chip 46.

The driving chip 46, which is a driver-IC, is connected to the flexible connector 44, one side of the flexible connector 44 is connected to the PCB 42, and the other side thereof is connected to the second substrate 20. The flexible connector 44 has a film shape which is easily bent, and the control portion 40 receives an external signal.

In the liquid crystal panel 1 according to the embodiment of the present invention, masking is applied differently to the first substrate 10 and the second substrate 20 so as to decrease a thickness of a non-etched region of the liquid crystal panel 1 after etching is performed. That is, since the masked regions on the first substrate 10 and the second substrate 20 are different from each other and etching is performed by being divided into primary etching and secondary etching, the thickness of the non-etched region may be decreased.

The first substrate 10 according to one embodiment includes a first base member 12, a first head portion 14, and a first tail portion 16.

The first base member 12 has a plate shape facing the liquid crystal layer 30 and is etched twice. The first base member 12 is a rectangular panel, a thickness of the first base member 12 is decreased through the primary etching, and then the thickness thereof is further decreased through the secondary etching.

The first head portion 14 is connected to one side of the first base member 12 (a left side of FIG. 4), and only the primary etching is performed on the first head portion 14 whereas the secondary etching is not performed thereon. The first tail portion 16 is connected to the other side of the first base member 12 (a right side of FIG. 4), and only the primary etching is performed on the first tail portion 16 whereas the secondary etching is not performed thereon.

A thickness of each of the first head portion 14 and the first tail portion 16 is greater than a thickness of the first base member 12, and the first head portion 14 and the first tail portion 16 have the same thickness. When the thickness of the first head portion 14 is set to a first thickness T1, the thickness of the first base member 12 is set to a second thickness T2, and the thickness of the first tail portion 16 is set to a third thickness T3, the first thickness T1 is the same as the third thickness T3. In addition, each of the first thickness T1 and the third thickness T3 is greater than the second thickness T2.

The second substrate 20 is installed in a state of being spaced apart from the first substrate 10 with the liquid crystal layer 30 interposed therebetween. Etching is performed on the entire area of the first substrate 10, and an extension 28 which is a non-etched region is provided on the other side of the second substrate 20. The non-etched region is a portion on which etching is not performed, and masking tape 52 is attached to the extension 28 of the second substrate 20 so that etching is not performed.

The second substrate 20 according to one embodiment includes a second base member 22, a second head portion 24, a second tail portion 26, and the extension 28.

The second base member 22 is installed in a shape facing the first base member 12 with the liquid crystal layer 30 interposed therebetween. The second base member 22 is a rectangular panel and is installed at a position facing the first base member 12 with the liquid crystal layer 30 interposed therebetween. In addition, a thickness of the second base member 22 is decreased through primary etching, and then the thickness thereof is further decreased through secondary etching.

The second head portion 24 is connected to one side of the second base member 22 (the left side of FIG. 4), and only the primary etching is performed on the second head portion 24. The extension 28 is connected to the second head portion 24, and etching is not performed on the extension 28. The flexible connector 44 of the control portion 40 is connected to the extension 28 protruding from the second head portion 24. The second tail portion 26 is connected to the other side of the second base member 22 (the right side of FIG. 4), and only the primary etching is performed on the second tail portion 26.

A thickness of each of the second head portion 24 and the second tail portion 26 is greater than a thickness of the second base member 22, a thickness of the extension 28 is greater than the thickness of each of the second head portion 24 and the second tail portion 26, and the second head portion 24 and the second tail portion 26 have the same thickness.

When the thickness of the extension 28 is set to a fourth thickness T4, the thickness of the second head portion 24 is set to a fifth thickness T5, the thickness of the second base member 22 is set to a sixth thickness T6, and the thickness of the second tail portion 26 is set to a seventh thickness T7, the fifth thickness T5 is the same as the seventh thickness T7. In addition, each of the fifth thickness T5 and the seventh thickness T7 is greater than the sixth thickness T6. In addition, the fourth thickness T4 is greater than the fifth thickness T5 and the seventh thickness T7.

In addition, the first thickness T1, the third thickness T3, the fifth thickness T5, and the seventh thickness T7 are identical to each other, and the second thickness T2 is the same as the sixth thickness T6. In addition, since the first head portion 14 and the extension 28 are installed to be offset with a separation section D interposed therebetween, a vertical thickness of the liquid crystal panel 1 is decreased.

As shown in FIG. 2, a gap between an imaginary line extending downward from an end portion of the first substrate 10 (a left side of FIG. 2) and an imaginary line extending downward from an end portion of the other end of the extension 28, which is the non-etched region, is referred to as the separation section D. In the liquid crystal panel 1, since the separation section D is provided between the extension 28, which is the non-etched region, and the first substrate 10, the vertical thickness of the liquid crystal panel 1 may be maintained to be thin when compared to the related art.

That is, since the first substrate 10 is not located above the extension 28, the thickness of the extension 28 becomes the thickness of the liquid crystal panel 1, and the thickness of the liquid crystal panel 1 in the separation section D is the same as the thickness of the second head portion 24. In addition, at a position at which the first head portion 14 faces the second head portion 24, the sum of the thicknesses of the first head portion 14 and the second head portion 24 becomes the thickness of the liquid crystal panel 1. At a position at which the first base member 12 faces the second base member 22, the sum of the thicknesses of the first base member 12 and the second base member 22 becomes the thickness of the liquid crystal panel 1. In addition, at a position at which the first tail portion 16 faces the second tail portion 26, the sum of the thicknesses of the first tail portion 16 and the second tail portion 26 becomes the thickness of the liquid crystal panel 1.

A variety of modifications are possible within the technical spirit in which the encapsulation portion 50 is installed in a shape surrounding the extension 28 and the control portion 40 so as to prevent an etching solution from infiltrating into the extension 28 and the control portion 40 of the second substrate 20. The encapsulation portion 50 according to one embodiment includes the masking tape 52, a sealing member 54, and an encapsulation member 56.

The masking tape 52 is attached to surround an upper side of the second substrate 20, in which the electrodes are exposed, and an upper side of the flexible connector 44 connected to the second substrate 20.

The sealing member 54 is applied onto an upper surface of the attached masking tape 52 and cured. The sealing member 54 is an ultraviolet (UV) resin seal and encapsulates and protects the electrodes exposed on the second substrate 20. The sealing member 54 according to one embodiment is installed to be in contact with an end portion of one side of the first substrate 10 in a state of being stacked on an upper side of the masking tape 52.

The encapsulation member 56 is in the form of an envelope and prevents the etching solution from infiltrating into the control portion 40. In a state in which the encapsulation member 56 surrounds the control portion 40, the encapsulation member 56 is fixed using the masking tape 52.

The masking tape 52, which fixes the encapsulation member 56, does not extend to the first substrate 10 and is attached to the sealing member 54. In addition, the masking tape 52, which fixes the encapsulation member 56 facing the extension 28 of the second substrate 20, is installed in the form of completely surrounding an outer side of the extension 28. Therefore, the etching solution is prevented from infiltrating into the extension 28 during an etching process.

In order to prevent the first tail portion 16 and the second tail portion 26 from being further etched after the primary etching is performed, a masking member 60 is installed on outer sides of the first tail portion and the second tail portion 26.

Various types of acid-resistant materials may be used within the technical spirit of preventing an etching solution from infiltrating into the first tail portion 16 and the second tail portion 26 during the etching process as the masking member 60. The masking member 60 according to one embodiment employs polyvinyl chloride (PVC) and is installed in the form of surrounding the outer sides of the first tail portion 16 and the second tail portion 26.

Hereinafter, a liquid crystal panel etching method according to one embodiment of the present invention will be described in detail with reference to the accompanying drawings.

Figure 7:
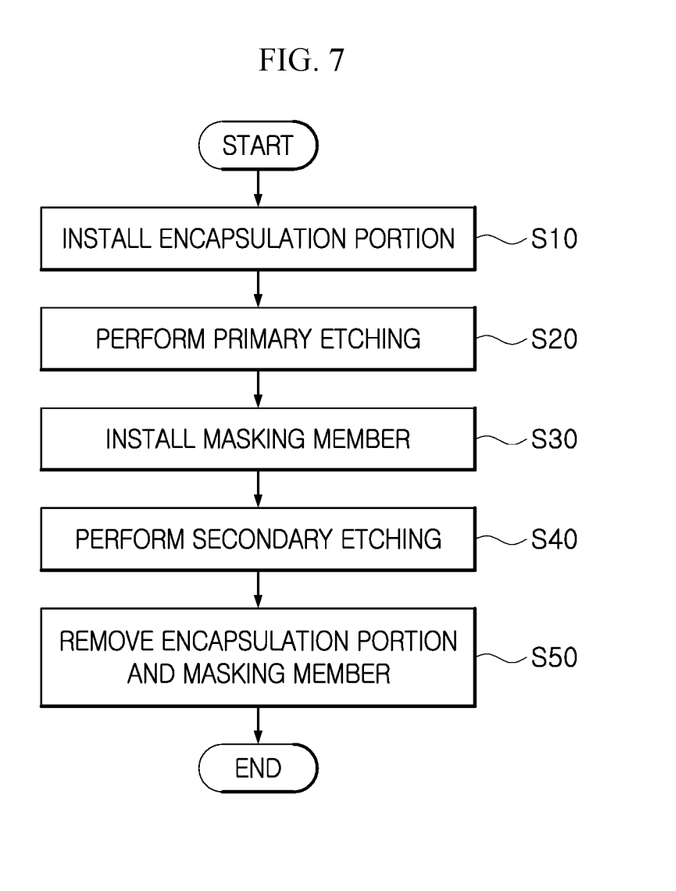
FIG. 7 is a flowchart illustrating a liquid crystal panel etching method according to one embodiment of the present invention.

FIG. 7 is a flowchart illustrating a liquid crystal panel etching method according to one embodiment of the present invention.

As shown in FIGS. 1 and 7, the liquid crystal panel etching method according to one embodiment of the present invention includes installing the encapsulation portion 50 which prevents an etching solution from infiltrating into the extension 28 of the second substrate 20 and the control portion 40 connected to the second substrate 20 (S10).

The installing of the encapsulation portion 50 according to one embodiment includes installing the masking tape 52 on the control portion 40 and installing the sealing member 54 between the masking tape 52 and the first substrate 10. In this case, the sealing member 54 prevents the etching solution from infiltrating between an end portion of the first substrate 10 and the masking tape 52.

In addition, the installing of the encapsulation portion 50 includes installing the encapsulation member 56 which surrounds the sealing member 54 and the control portion 40 and fixing the encapsulation member 56 to the sealing member 54 and the extension 28. When the fixing of the encapsulation member 56 using the masking tape 52 is completed, the masking tape 52 is attached to the second substrate 20 with a width of a predetermined interval. In this case, since the masking tape 52 does not invade a region in which the first substrate 10 is located and is attached while maintaining the predetermined interval, the entire area of the first substrate 10 is etched during primary etching.

In addition, as shown in FIGS. 2 and 7, the liquid crystal panel etching method includes primarily etching the first substrate 10 and the second substrate 20 using the etching solution (S20). In the primary etching of the first substrate 10 and the second substrate 20, the first head portion 14 of the first substrate 10, the first base member 12, and the first tail portion 16 are etched at the same thickness, and the second head portion 24, the second base member 22, and the second tail portion 26 of the second substrate 20 are also etched at the same thickness.

After the primary etching, only the extension 28 to which the masking tape 52 is attached remains as a non-etched region, and the entire area of the liquid crystal panel 1 is etched to decrease a thickness thereof.

In addition, as shown in FIGS. 3 and 7, the liquid crystal panel etching method includes installing the masking member 60 in portions of the first substrate 10 and the second substrate 20, on which only the primary etching is performed (S30). In the installing of the masking member 60 according to one embodiment, since the masking member 60 is installed on outer sides of the first head portion 14, the first tail portion 16, the second head portion 24, and the second tail portion 26, secondary etching is prevented from being performed.

Since the first substrate 10 and the second substrate 20 are bonded to each other with the same size in portions except for the extension 28, an installation position of the masking member 60 may be determined in consideration of a bending direction of a display to be implemented.

In addition, as shown in FIGS. 4 and 7, the liquid crystal panel etching method includes secondarily etching the first substrate 10 and the second substrate 20 using the etching solution (S40). In the secondary etching of the first substrate 10 and the second substrate 20, only the first base member 12 and the second base member 22, in which the masking member 60 is not installed, are secondarily etched.

After the secondary etching of the first substrate 10 and the second substrate 20, since the extension 28, which is connected to the second head portion 24 and on which etching is not performed, is installed to be offset from the first head portion 14 with the separation section D disposed therebetween, a thickness of the region is formed to be thin so that formability is improved.

In addition, as shown in FIGS. 5 to 7, the liquid crystal panel etching method includes removing the encapsulation portion 50 and the masking member 60 (S50). The liquid crystal panel 1 in which the encapsulation portion 50 and the masking member 60 are removed is bent at a set curvature so that more stable formability may be provided.

As described above, according to embodiments of the present invention, masking is applied differently to the first substrate 10 and the second substrate 20, and the thickness of the non-etched region, which is formed after the first substrate 10 and the second substrate 20 are etched through a double etching method, is reduced so that a display with a small radius of curvature may be easily implemented.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A liquid crystal panel etching method comprising:
    installing an encapsulation portion configured to prevent infiltration of an etching solution on an extension of a second substrate and a control portion connected to the second substrate;
    primary etching a first substrate and the second substrate using an etching solution;
    installing a masking member in portions of the first substrate and the second substrate, on which only the primary etching is performed;
    secondary etching the first substrate and the second substrate using an etching solution; and
    removing the encapsulation portion and the masking member.

2. The liquid crystal panel etching method of claim 1, wherein the installing of the encapsulation portion includes:
    installing masking tape on the control portion and installing a sealing member between the masking tape and the first substrate;
    installing an encapsulation member that surrounds the sealing member and the control portion; and
    fixing the encapsulation member to the sealing member and the extension.

3. The liquid crystal panel etching method of claim 1, wherein in the primary etching of the first substrate and the second substrate, a first head portion, a first base member, and a first tail portion of the first substrate are etched to the same thickness, and a second head portion, a second base member, and a second tail portion of the second substrate are also etched to the same thickness.

4. The liquid crystal panel etching method of claim 3, wherein in the installing of the masking tape, the masking member is installed on outer sides of the first head portion, the first tail portion, the second head portion, and the second tail portion.

5. The liquid crystal panel etching method of claim 3, wherein in the secondary etching of the first substrate and the second substrate, only the first base member and only the second base member are secondarily etched.

* * * * *